May 6, 1941.   F. SÖNNICHSEN   2,240,896
APPARATUS FOR ELECTRIC WELDING
Filed Nov. 20, 1939   2 Sheets-Sheet 1
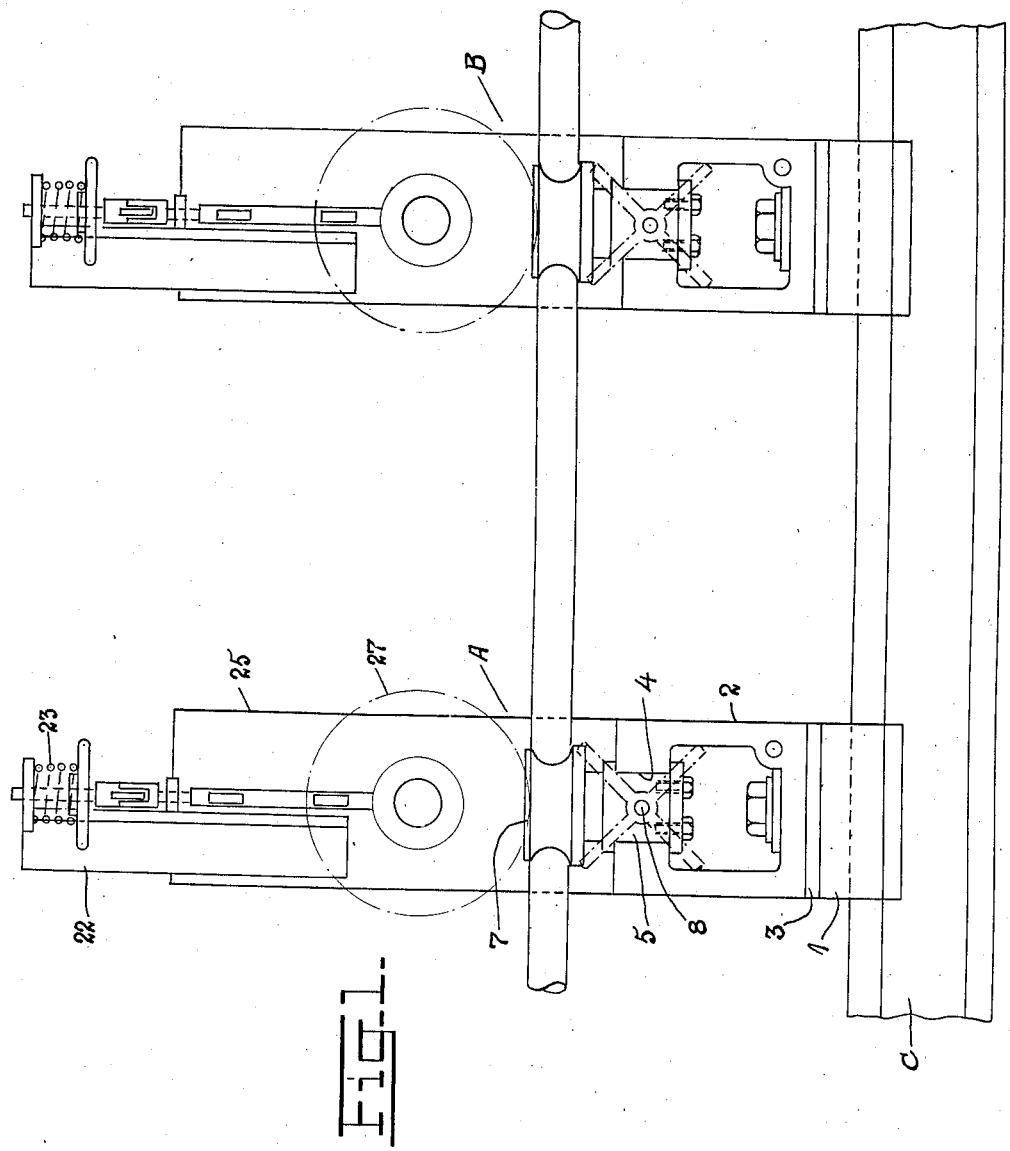

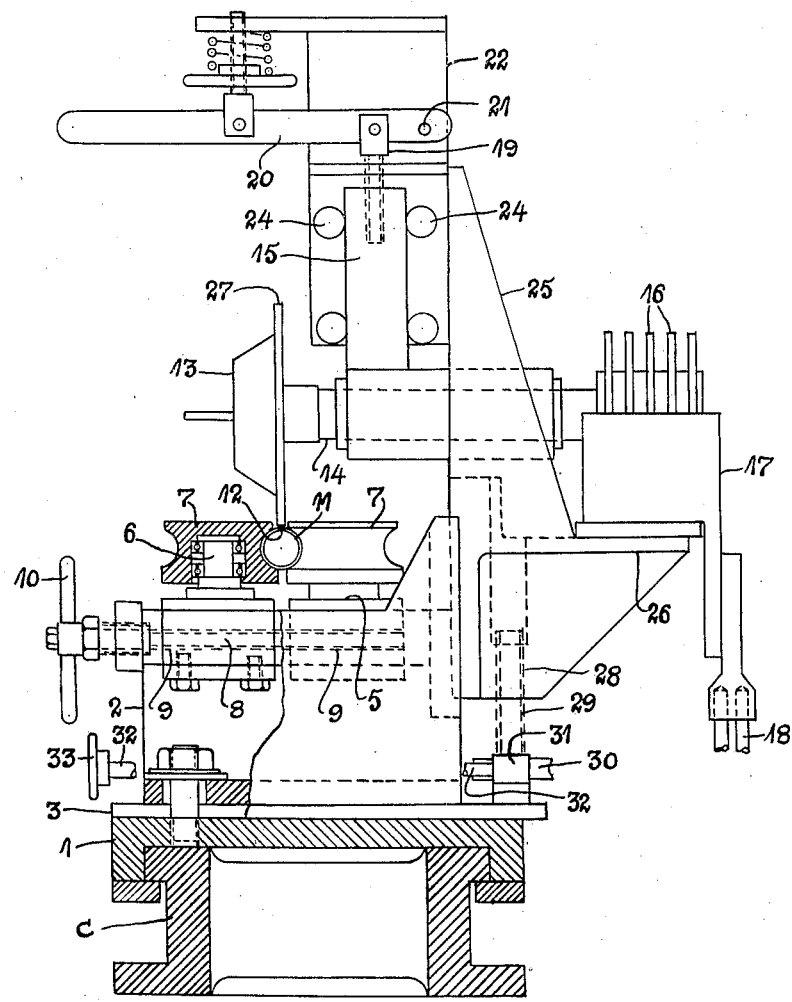

Patented May 6, 1941

2,240,896

UNITED STATES PATENT OFFICE 2,240,896

APPARATUS FOR ELECTRIC WELDING

Francis Sönnichsen, Oslo, Norway

Application November 20, 1939, Serial No. 305,385
In Norway October 10, 1939

2 Claims. (Cl. 219—6)

The present invention relates to apparatus for electric welding of a longitudinal seam on a pipe, tube or similar body.

A main object of the invention is to provide welding apparatus, by the use of which it is easily possible to vary the intensity of the current which passes through the pipe or the like to be welded, thereby controlling the heat developed in the weld.

Another object of the invention is to provide a welding apparatus in which electrodes of different sizes may be used and in which exchange of the electrodes is easily possible. A further object of the invention is to facilitate controlling of the transition resistance between the electrodes and the pipe or the like by varying the pressure of the electrode on the pipe. A further object is to provide welding apparatus by which the relative position of the electrode and the seam to be welded may be easily adjusted.

A still further object is to make it possible to press the pipe or the like together, more or less, without altering the position of the pipe relatively to the electrode.

The invention will now be described with reference to the accompanying drawings in which:

Fig. 1 is a side view of apparatus according to the invention, comprising two electrode supports and Fig. 2 is an end view, partly in section, of one of the supports shown in Fig. 1.

The apparatus according to the invention comprises two or more supports A and B, slidably carried on a girder C. Each support includes a base plate 1 resting directly on the girder C. A body 2 is by means of screws rigidly secured to the base plate, but electrically isolated from the same by means of insulating material 3. The body 2 is at its top provided with a slot 4 extending in horizontal direction transversely of the longitudinal direction of the girder C. Two blocks 5 are slidably mounted in the said slot, each block being provided with a vertical upwardly projecting pin 6 on which may be rotatably mounted a grooved roller 7. The blocks 5 may be adjusted relatively to each other by means of a threaded bolt 8 provided with right and left threads corresponding to threaded bores 9 in the blocks. A hand wheel or handle 10 mounted on the outwardly projecting end of the said bolt serves for operating the bolt. 11 designates a pipe to be welded along the seam 12, the pipe being held in desired position by means of the rollers 7. The grooves in the rollers are so shaped and dimensioned that the rollers, when moved into engagement with the pipe by means of the screw bolt 8 encompass substantially the whole section of the pipe, with the exception of the seam borders on top of the pipe section and a corresponding part on the bottom side.

In order to make it possible to weld pipes of different diameters the rollers may be exchangeably mounted on the blocks 5, or the blocks may themselves be exchangeably mounted in the slot 4.

The electric current is fed to the seam 12 by means of a contact roller or electrode 13. This electrode is rigidly mounted on one end of a horizontal shaft 14 rotatably mounted at the lower end of a guiding piece 15. The other end of the said shaft carries contact discs 16 projecting down into a quantity of mercury contained in a cup shaped container 17, which by means of conduits 18 may be connected to a suitable source of electric current.

The guiding piece 15 is by means of a link 19 suspended on a lever 20 pivotally mounted at 21 on a frame part 22. A spring 23 presses the lever 20 downwardly. Weights may also be hung on the free end of the lever in order to increase the downward pressure on the guiding piece 15. The frame part 22 carries ball bearings or the like 24, two or more on each side of the guiding piece 15, by means of which ball bearings the guiding piece is secured against movement in horizontal direction. The frame part 22 is rigidly secured to another frame part 25, these two frame parts constituting the upper part of the support A, the lower part consisting substantially of base plate 1, and body 2. The frame part 25 is provided with a bracket 26 on which the mercury container 17 is mounted.

As will be understood, the electrode or contact roller 13 is so positioned that its rim 27 will roll against the seam of the pipe, between the two rollers 7. By means of the guiding device comprising the guiding piece 15 and the ball bearings 24 the contact roller is secured against displacement in a direction transversely or longitudinally of the seam.

Further an adjustable pressure between the contact roller and the seam is attained by means of the lever 20, spring 23 and weights being on the free end of the said lever.

In order to make it possible to use contact rollers of different size, the upper part of the support, comprising the frame parts 22 and 25 is mounted adjustably in a vertical direction relatively to the lower part, comprising the body 1. To this end the frame part 25 is provided with a vertical threaded bore 28 into which is screwed a spindle 29 rotatably mounted on the body 1, but electrically isolated from the same. The spindle is at its lower end provided with a worm wheel 30 cooperating with a worm 31 rigidly mounted at the right end of a shaft 32 which may be rotated by means of the hand wheel 33.

When using the apparatus according to the invention two or more supports are mounted on a common girder and a pipe or the like to be welded is arranged in position between the rollers 7. The rollers, being chosen in accordance with the diameter of the pipe are pressed into engagement with the pipe, if necessary with a pressure sufficient to press the edges of the seam into contact with each other. The distance between two supports is chosen in accordance with the strength of the current to be used and the dimensions of the pipe in such a way that a maximum operation speed may be obtained. During the welding operation the pipe is fed through the apparatus with constant or varying speed.

I claim:

1. Apparatus for electric welding of a longitudinal seam of a pipe comprising, a girder, a plurality of supports slidably mounted on said girder, means for insulating said supports with respect to the girder, two rollers rotatably mounted on each support and being adapted to bear against opposite sides of the pipe to be welded, a guiding piece suspended on each support, rotatable guide means mounted on each support for preventing lateral movements of the guide piece in directions transversely of the seam of the pipe to be welded, a contact roller adapted to engage the pipe adjacent said seam rotatably mounted on each guide piece, means for yieldably urging each guide piece toward the pipe so that each contact roller presses against the pipe adjacent the seam to be welded, and means including a conducting liquid for connecting each contact roller to a source of current.

2. Apparatus for electric welding of a longitudinal seam of a pipe comprising, a girder, a plurality of supports slidably mounted on said girder, means for insulating said supports with respect to the girder, two rollers rotatably mounted on each support and being adapted to bear against opposite sides of the pipe to be welded, a lever pivotally mounted on each support, a guide piece suspended on each lever, rotatable guide means mounted on each support for preventing lateral movements of the guide piece in directions transversely of the seam of the pipe to be welded, a contact roller adapted to engage the pipe adjacent said seam rotatably mounted on each guide piece, means for yieldably urging each guide piece toward the pipe so that each contact roller presses against the pipe adjacent the seam to be welded, and means including a conducting liquid for connecting each contact roller to a source of current.

F. SÖNNICHSEN.